Feb. 9, 1960  H. L. POHNDORF  2,924,421
HIGH PRESSURE CYLINDER VALVE
Filed April 10, 1956
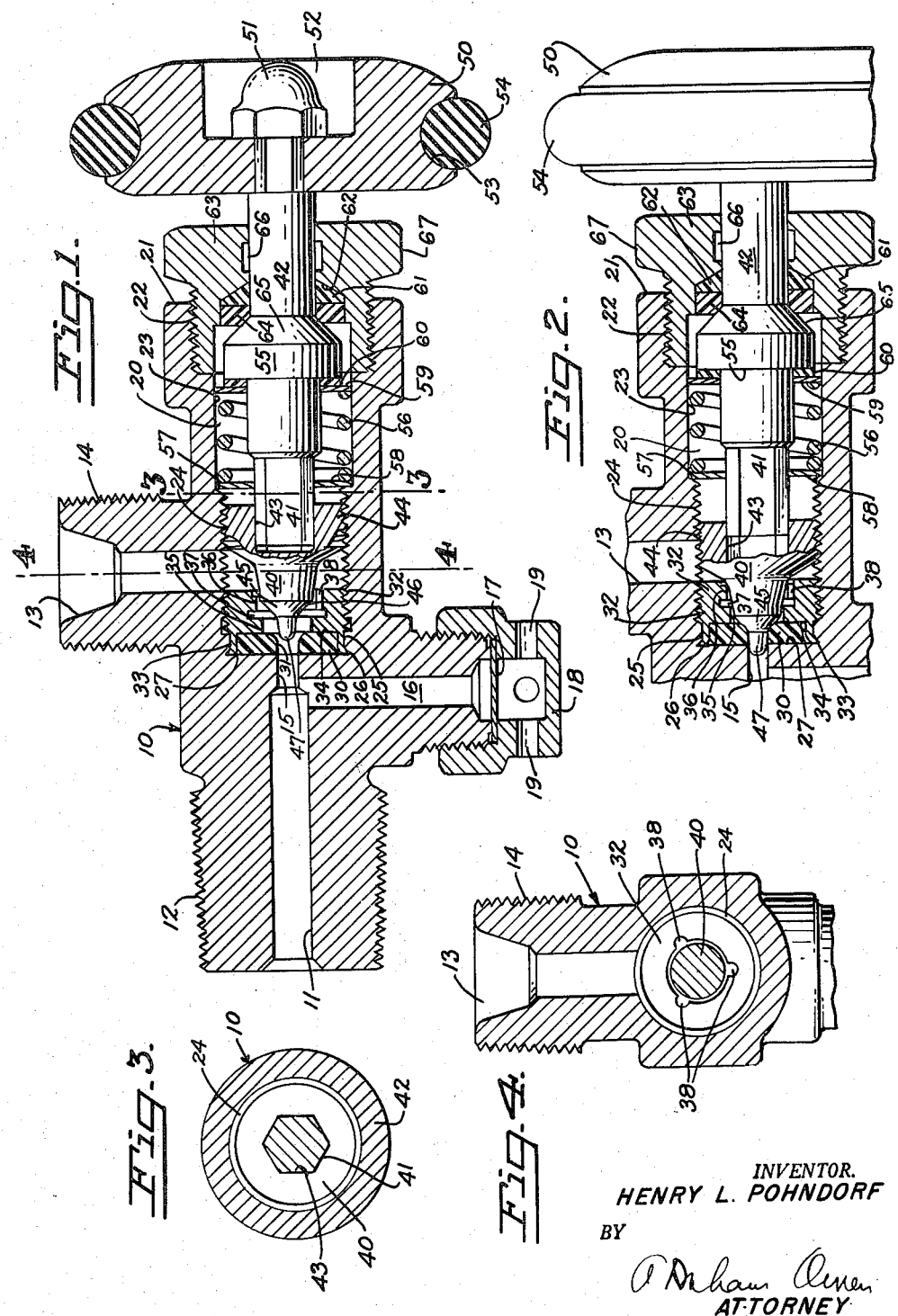
INVENTOR.
HENRY L. POHNDORF
BY
ATTORNEY

2,924,421

HIGH PRESSURE CYLINDER VALVE

Henry L. Pohndorf, El Cerrito, Calif., assignor to National Welding Equipment Company, San Francisco, Calif., a corporation of California Application April 10, 1956, Serial No. 577,316

4 Claims. (Cl. 251—210)

This invention relates to improvements in a valve for use with cylinders of compressed gas, such as oxygen, acetylene, and the like.

One object of the invention is to provide an arrangement for protecting the valve seat from destruction by the movement of gas through the valve and for substantially prolonging the useful life of the valve seat. In prior art cylinder valves, sudden pulses of gas have tended to destroy the valve seats, which are made of soft material and were left exposed to the passage of gas. For example, when several cylinders were connected into a manifold through their respective valves, and when the gas in one cylinder became exhausted and a previously closed valve in another full cylinder was opened, the gas rushed into what is normally the outlet for the exhausted cylinder valve and struck its valve seat with considerable force, often tearing chunks out of it, or fracturing it, or blowing it out of place, and in some cases even igniting the seat. Similarly, the initial rush of oxygen or other gas under pressure through the valve of a full cylinder tended to damage, displace, and ignite its valve seat. The present invention solves these problems by providing a valve seat completely protected by metal members and exposing only the minimum necessary amount of its surface to the on-rushing pressures and igniting tendencies of high pressure gas in both directions. When my new valve is closed, the valve seat is fully protected against ignition by high pressure oxygen that may rush in through the outlet when another high pressure valve in communication with it is opened rapidly.

Another object is to protect the valve seat and the stem packing from damage and destruction by jamming. In prior art valves, the practice of jamming a valve into its closed position was followed by many consumers in order to make sure that the valve was fully closed, but the jamming tended to damage the seat by loosening it from its anchoring and by forcing some of its portions into positions where they were more easily fractured or broken off by the subsequent passage of gas. A similar problem occurred when the valve was jammed in its fully open position, the stem packing then being damaged. In the present invention the structure of both the valve seat and the stem packing and their relation to the other valve elements are such that jamming the valve closed actually benefits it by a beneficial re-forming of the seat that improves its sealing action. Similarly, jamming the valve in its open position benefits the stem packing.

Another problem with valve seats in cylinder valves heretofore in use was that once such a seat was damaged, it could not be replaced without first removing the entire valve from the cylinder. The valve seat of the present invention is removable, along with the other elements of the valve, without having to take the cylinder valve off the cylinder, and it can be replaced in the same manner. The valve seat is locked in fixed position while the other element of the valve is movable; this reverses usual practice, so that here the fact that the seat is removable means that the entire valve can be removed from its housing without having to remove the housing from the cylinder.

Another object of the invention is to provide a cylinder valve made entirely from non-ferrous metal parts. It is well known that stainless steel and other ferrous metals burn readily if fed by burning parts, but they have been included in many cylinder valves heretofore. The construction of the present valve makes it very practical to eliminate that fire hazard.

Another object is to provide a valve plug member produced from very hard bronze with sufficient wall thickness to prevent its expansion by the action of the driving key.

Another object is to eliminate the T-slot formerly used in cylinder valves to connect the driving key to the valve plug element, and which has enlarged and jammed the valve plug threads at times when the valve was jammed closed.

Other objects and advantages of the invention will appear from the following description of a preferred embodiment thereof, presented in accordance with 35 USC 112.

In the drawings:

Fig. 1 is a view in elevation and in section of a cylinder valve embodying the principles of the present invention with the valve shown in its open position.

Fig. 2 is a similar view of a portion of the structure of Fig. 1 with the valve shown in its fully closed position.

Fig. 3 is a view in section taken along the line 3—3 in Fig. 1.

Fig. 4 is a view in section taken along the line 4—4 in Fig. 1.

General description of the housing and gas passages

The cylinder valve of this invention is provided with a housing 10, preferably of strong bronze, having an inlet passage 11 from the cylinder (not shown), to which it is attached by exterior threads 12, and an outlet 13 extending out through a threaded fitting 14. The gas from the cylinder therefore passes from the inlet 11 through a valve passage 15 to the outlet 13. A safety passage 16 on the inlet side of the valve passage 15 leads to a safety device, such as a frangible silver disc 17 held by a cap 18. If the pressure on the inlet side of the valve should become too high, the disc 17 breaks and permits the passage of gas through the safety outlets 19.

The inlet passage 11 and the valve passage 15 lie along the main axis of the housing 10, as does a coaxial stepped interior passage 20 extending into the housing 10 from an open end 21 oposite the inlet. Moving axially from the end 21 (right to left in Figs. 1 and 2), the interior passage 20 comprises a widest diameter, threaded portion 22, a stepped-in smooth-bore portion 23, a narrower-diameter threaded portion 24, and a narrowest diameter, terminal smooth-bore portion 25, which is provided with an anular groove-like cavity 26 where the terminal portion 25 meets a flat radial wall 27 at the outlet side of the valve passage 15.

The valve seat and its retainer

A valve seat 30, preferably made from nylon or other compressible noninflammable, nonflowing material, is seated against the flat wall 27. As initially prepared, the valve seat 30 is annular, having a central valve opening 31 therethrough, coaxial with the valve passage 15. The radial sides of the valve seat 30 are preferably planar and the outer periphery cylindrical. The opening 31 flares outwardly at its outlet end. The bell-mouth shape of the nylon seat induces a steamline flow that reduces the tearing effect of erratic pressure waves.

It will be noted that the outer periphery of the valve seat 30 is spaced radially inwardly from the terminal bore 25. A generally sleeve-shaped, preferably bronze valve seat retainer 32 threaded into the passage portion 24 has a forwardly-projecting rim portion 33 that fills the space between the outer periphery of the valve seat 30 and the bore 25. The end of the rim 33 is upset under pressure into the groove 26, so that high pressure gases cannot possibly get around the outer periphery of the seat 30 and loosen it. Similarly, the retainer 32 has a shoulder 34 that overlies the seat's outer radial face, leaving only a small portion exposed. Beyond the seat, the valve seat retainer 32 is provided with two interior bore portions 35 and 36 of different diameter, with an annular groove 37 between them. The smaller-diameter bore portion 35 narrows the clearance around the valve stem and protects the seat 30 from excessive back-pressure when gases pass in through the outlet 13 when the valve is closed, while still permitting free passage of gas from the passage 15 to the outlet 13 when the valve is open. The groove 37 provides for chip clearance during the manufacture of the part, allowing room for collection of the chips produced during the broaching operation. Axially extending Bristol splines 38 are also provided, for engagement by a suitable tool when installing and removing the seat retainer 32.

The valve plug

The movable valve member comprises a valve plug 40 which floats, splined to a key 41 which is an integral portion of a brass or bronze valve stem 42. The key 41 is polygonal, preferably hexagonal in shape, and the valve plug 40 is broached to provide a matching polygonal, preferably hexagonal, recess or driving cavity 43 engaged by the key 41. A portion 44 of the outer periphery of the valve plug 40 is threaded and engages the threaded passage portion 24 rearwardly from the seat retainer 32. The plug 40 is produced from very hard bronze and the walls around the driving cavity 43 are of substantial thickness to resist any tendency to become expanded by the driving key 41. This polygonal keying replaces the T-slot arrangement formely used in cylinder valves, which tended to cause the threaded portions 44 to become enlarged and jam, when the valve was jammed in closed position.

Beyond the driving cavity 43 the valve plug's outer periphery is stepped inwardly from the portion 44 to provide a tapered or frusto-conical central portion 45 that terminates in a valve head 46 that engages the seat 30. The head 46 includes a central forward generally cylindrical projection 47 rounded at its outer end and joined by a curved juncture with the remainder of the head 46, which flares outwardly toward the frusto-conical portion 45. An important feature is that the projection 47 is longer than the thickness of the seat 30, i.e., than the length of the opening 31.

Operation of the valve plug relative to the seat and seat retainer

Rotation of the driving key 41 moves the plug 40 back and forth as its threads 44 turn in the threads 24, and this movement projects and retracts the valve head 46 and projection 47 relative to the seat 30, so as to open and close the valve passage 15. When the valve plug 40 is in engagement with the valve seat 30 and is jammed into it, it will tend to re-form the face of the seat 30 to the shape of the head 46, thereby insuring a tight closure without damaging the valve seat 30. In fact, jamming the valve closed is good for the valve.

When the valve is closed (Fig. 2), the clearance between the valve plug 40 and the forward smaller diameter bore portion 35 of the valve seat retainer 32 is relatively small and prevents substantially any passage of back-pressure gas from the outlet 13 against even the very narrow annular area of the valve seat not actually covered by the retainer 32 and the head 46. At that time the clearance between the wider diameter bore portion 36 and the wider part of the frusto-conical portion 45 of the valve plug 40 is also very narrow. However, when the device is in its open position shown in Fig. 1, there is adequate clearance for the passage of gas from the passage 15 between the plug 40 and the seat retainer 32, because the head 46 is then adequately spaced from both the valve seat 30 and the seat retainer bores 35 and 36, while the narrow portion of the frusto-conical portion 45 of the valve plug is then opposite the bore portion 36, providing sufficient clearance there. When the valve is closed, no gas from the cylinder can flow against the valve seat 30, because the valve head projection 47 projects through and beyond the valve seat 30 and fits snugly against the sides of the opening 31, as shown in Fig. 2. In other words, when the valve is closed, the valve seat 30 is almost completely surrounded by metal portions and the insignificant clearances permit only limited and very slow access of gas, so that such gas must build up any pressure against the seat 30 slowly, instead of subjecting it to the danger of ignition by a fast rush against the valve seat.

When the valve is open, the gas from the inlet will pass through the valve passage 15 and the valve seat opening 31 into the clearance between the valve plug 40 and the seat retainer 32 and thence freely to the outlet passage 13.

The valve stem

The valve stem 42 is provided at its outer end with a hand wheel 50 secured to the outer end of the valve stem 42 by a lock nut 51, seated inside a recessed cavity 52. The hand wheel 50 is preferably provided around its outer periphery with a semi-cylindrical groove 53 in which a neoprene snap-ring 54, generally toroidol in shape, is provided to insure a soft and sure grip.

The valve stem 42 is provided with an enlarged bearing portion 55 that compresses a main spring 56 toward the shoulder 57 between the valve body's smooth bore 23 and the narrower threaded portion 24. A valve washer 58 is provided to engage the spring at the shoulder 57, and another washer 59 is provided adjacent the valve stem bearing 55. A nylon thrust washer 60 is interposed between the washer 59 and bearing portion 55 to reduce friction and give a soft action.

The packing rings

An annular packing member 61, preferably of teflon (tetrafluorethylene) or similar material is seated in a generally conical cavity provided in a valve packing nut 63, which is threaded into the widest-diameter passage portion 22. The Teflon packing ring 61 is subject to flow so that it can tightly engage with the valve stem 42, thereby preventing leakage. It is also fully enclosed between stem 42, the valve packing nut 63, and a second annular packing member 64, which is preferably of nylon or other non-cold-flowing material. The nylon ring 64 is preferably substantially rectangular in cross section and is seated against the packing 61 and the wider portion of the conical cavity 62. It encircles the stem 42, and engages not only its cylindrical portion, but also the conical portion 65 that flares out toward the enlarged bearing portion 55.

The fully-enclosed Teflon member 61 provides a very tight packing, especially when the valve stem 42 is jammed into its open position where the pressure against the Teflon ring 61 can substantially re-form it. At the same time, the nylon ring 64 prevents seizure of the stem portion 65 and thereby provides for a relatively frictionless movement of the stem 42. Similarly, the nylon bearing member 60 also reduces the friction between the stem portion 55 and the spring washer 59.

The packing nut 62 is provided with an annular recess 66 which serves to collect any chips or flakes that may break off from the Teflon packing 61 and thereby prevents these flakes or chips from jamming the valve. Any wear on the packing 61 is therefore accommodated for by jamming the valve open and, contrary to most valves, this valve operates best when it is jammed into its open or closed position so that the operator never has to worry whether he is damaging the valve by so doing.

Summary of operation of the valve

In operation, the valve inlet end 12 is threaded into a cylinder (not shown) and the valve outlet fitting 14 is threaded into a manifold (not shown) or a torch (not shown) or other useful member. The valve is normally kept in its closed position with its handle 50 so turned that the valve plug head 46 is engaged snugly against the generally radial face of the seat 30, and its projection 47 then extends all the way through the seat 30 and guards the valve seat 30 from the gas in the cylinder. Narrow clearances between the plug 40 and the retainer 32 protect the seat 30 from back pressure.

When the hand wheel 50 is turned, there is a low-friction soft-feeling action, and the valve plug 40 is retracted. At all times the pressure of the spring 56 holds the packing 61 in place to seal around the valve stem 42, while the nylon thrust bearings 60 and 64 provide for low friction operation. When the valve head 47 is withdrawn from the valve passages 15 and 31, the gas can flow from the inlet 11 through the passages 15 and 31 around the plug 40 into the outlet 13. As the hand wheel 50 is moved to its outermost position, the plug 40 is stopped by engagement of the end of the recess 43 with the key 41 and the engagement of the plug 40 with the washer 57, causing the spring 56 to compress the conical portion 65 against the nylon packing ring 64, which in turn transmits this pressure to the packing 61, thereby reforming the packing 61 so that it tightly seals off any passages around the valve stem.

The valve is easily assembled and can be disassembled without being disconnected from the cylinder. For disassembly, the lock nut 51 may be first removed and the handle 50 taken off. Whether this is done or not, a polygonal collar 67 of the packing nut 63 may be engaged by a wrench and unthreaded from the passage 22, normally carrying with it the nylon thrust member 64 and the Teflon packing ring 61, which are easily removed therefrom. Or, if the seizure of the packing ring 61 causes it and the nylon ring 64 to remain around the stem 42, they are readily taken out after the nut 63 is removed. The stem 42 may come out with the packing nut 63 or be taken out thereafter (unless the handle 50 is left on, in which case it necessarily comes out with the packing nut 63). The spring 56, washers 58 and 59, and nylon thrust washer 60 come out with the stem 42.

The valve plug 42 is then unthreaded by reinserting the key 41 and continuing to turn it beyond the passage 44, or a polygonal drive like the key 41 may be used. Then a tool is inserted into the retainer 32, in engagement with the Bristol splines 38, and it is retracted from the threads 24, normally carrying the valve seat 30 with it. Reassembly is carried on, in generally reverse order, replacing parts when wear renders that advisable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a valve for cylinders of highly compressed gas having a valve body provided with an inlet, an outlet, and a valve-housing passage connected between said inlet and said outlet and having an end wall adjacent a narrow opening leading to said inlet, the combination of: an annular valve seat of compressible material seated against said end wall, having a central opening of substantially the same diameter as said narrow opening; a seat-retaining member secured to said body and having a portion interposed snugly between said body and the outer periphery of said valve seat, and a radial annular shoulder covering an outer margin of said valve seat; a valve plug with a head adapted to close against said seat and a generally cylindrical projection adapted, when said valve is closed, to project through said seat beyond said seat into said narrow opening and having a diameter sufficient to close off said seat completely from said inlet passage; and means for opening and closing said valve, said seat-retaining member having its said rim turned outwardly into a groove provided in said body adjacent said end wall so that high-pressure gases cannot pass around the outer periphery of the seat and loosen it and having a first bore portion adjacent said shoulder and a second bore portion of larger diameter, the smaller-diameter bore portion narrowing the clearance around said head and protecting said valve seat from excessive back pressure when gases pass in through said outlet when said valve plug is closed, while still permitting free passage of gas to said outlet when said valve plug is open.

2. In a valve for cylinders of highly compressed gas having a valve body provided with an inlet, an outlet, and a valve-housing passage connected between said inlet and said outlet and having an end wall adjacent a narrow opening leading to said inlet, the combination of: an annular valve seat of compressible material seated against said end wall, having a central opening of substantially the same diameter as said narrow opening; a seat-retaining member secured to said body and having a portion interposed snugly between said body and the outer periphery of said valve seat, and a radial annular shoulder covering an outer margin of said valve seat; a valve plug with a head adapted to close against said seat and a generally cylindrical projection adapted, when said valve is closed, to project through said seat beyond said seat into said narrow opening and having a diameter sufficient to close off said seat completely from said inlet passage; and means for opening and closing said valve, said seat-retaining member being provided with a first bore portion adjacent said shoulder and a second bore portion of larger diameter spaced therefrom by a chip-clearance groove, the smaller-diameter bore portion narrowing the clearance around said head and protecting said valve seat from excessive back pressure when gases pass in through said outlet when said valve plug is closed, while still permitting free passage of gas to said outlet when said valve plug is open, said chip-clearance groove allowing room for the collection of chips produced during the broaching operation.

3. The combination of claim 2 wherein said valve plug flares conically outwardly from said head and when closed provides very narrow clearance from both said seat-retaining member bore portions, while when open adequate clearance is provided.

4. In a valve for cylinders of highly compressed gas having a valve body provided with an inlet, an outlet, and a threaded valve-housing passage connected between said inlet and said outlet and having an end wall adjacent a narrow opening leading to said inlet, the combination of: an annular valve seat of compressible material seated against said end wall; a seat retaining member threaded in said passage and having a portion interposed snugly between said body and the outer periphery of said valve seat, a radial annular shoulder covering an outer margin of said valve seat, and two bore portions of different diameter, the narrower one lying closer to said valve seat; a valve plug having a portion threaded into said passage and a conical portion with a head adapted to close against said seat and a generally cylindrical projection adapted, when said valve is closed, to project through said seat beyond said seat into said narrow opening and having a diameter sufficient to close off said seat completely from said inlet passage, said conical portion, when said valve is closed, being spaced closely adjacent said seat retaining member bore portion with very narrow clearance therefrom tending to prevent back pressures from reaching and striking said seat; and means for opening and closing said valve.

References Cited in the file of this patent

UNITED STATES PATENTS

| | | | |
|---|---|---|---|
| 347,727 | Morrin | Aug. 17, | 1886 |
| 854,698 | Martell | May 21, | 1907 |
| 2,104,419 | Frye | Jan. 4, | 1938 |
| 2,492,402 | Smith | Dec. 27, | 1949 |
| 2,645,449 | Gulick | July 14, | 1953 |
| 2,692,750 | Davis | Oct. 26, | 1954 |
| 2,709,065 | Pohndorf | May 24, | 1955 |
| 2,726,843 | Evans | Dec. 13, | 1955 |
| 2,770,443 | Rand | Nov. 13, | 1956 |
| 2,817,545 | Uhler | Dec. 24, | 1957 |

FOREIGN PATENTS

| | | | |
|---|---|---|---|
| 519,949 | Belgium | Nov. 16, | 1953 |